June 7, 1966     E. E. IMUS     3,254,907
HINGED BELLOWS RESTRAINT
Filed Dec. 7, 1961
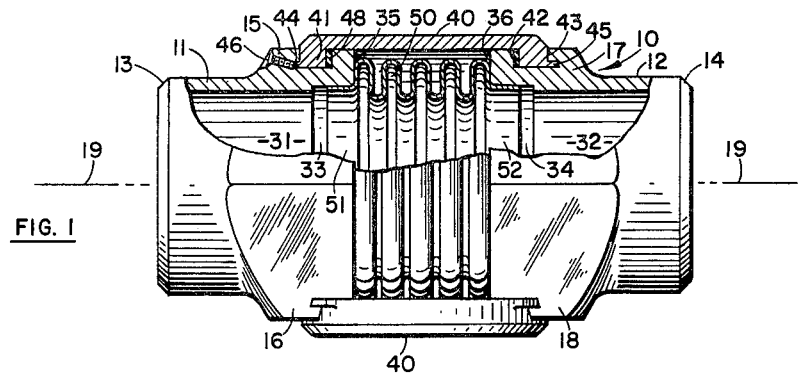
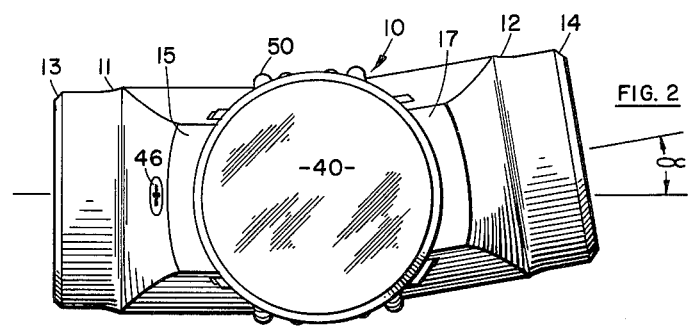
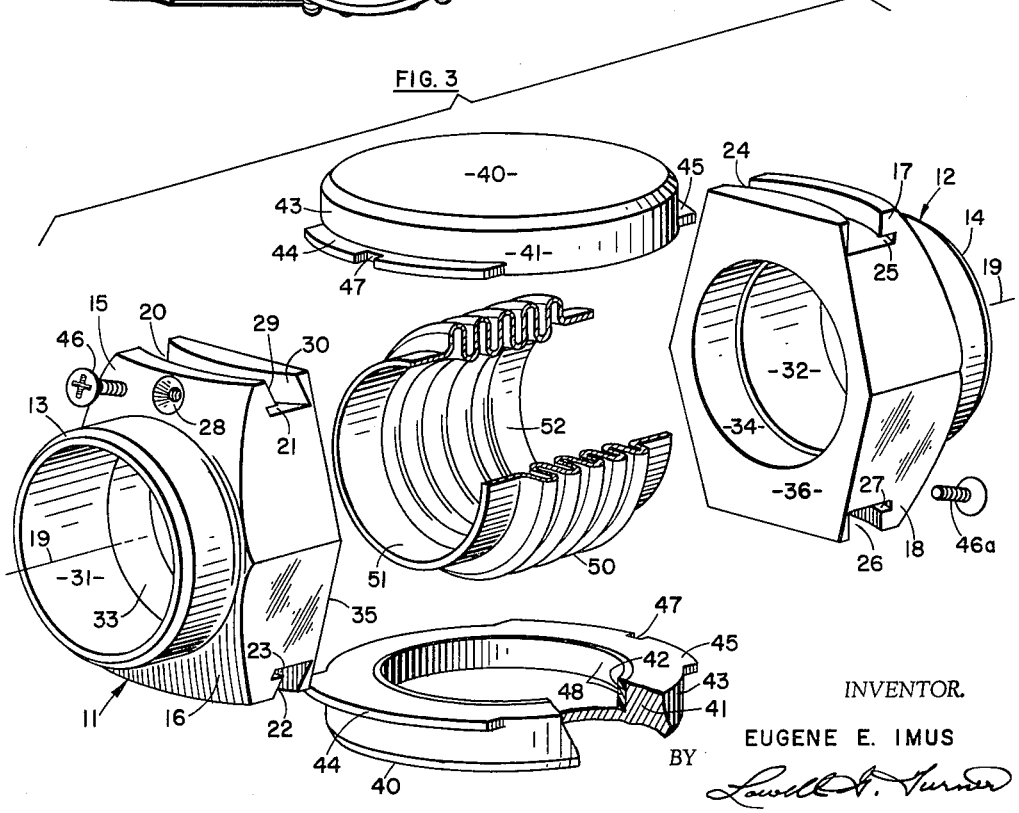
INVENTOR.
EUGENE E. IMUS
BY
AGENT

United States Patent Office 3,254,907
Patented June 7, 1966

3,254,907
HINGED BELLOWS RESTRAINT
Eugene E. Imus, Thousand Oaks, Calif., assignor to North American Aviation, Inc.
Filed Dec. 7, 1961, Ser. No. 157,709
5 Claims. (Cl. 285—90)

The invention described herein was made in the performance of work under a NASA contract and is subject to the provisions of the National Aeronautics and Space Act of 1958, Public Law 85–568, (72 Stat. 426; 42 U.S.C. 2451), as amended.

This invention relates to flexible means for interconnecting two conduits. More specifically, it relates to a hinged bellows restraint wherein a bellows member facilitates flexibility and a restraining member prevents axial movement while facilitating relative movement of interconnected conduits in a single plane.

Flexible joints or couplings of the kind in question have heretofore included a bellows interconnecting a pair of end members for ultimate connection to a pair of conduits. However, the means whereby such end members have been connected have generally been bulky, heavy, difficult to manufacture and deficient in their ability to carry high axial loads. A typical prior art device includes the well known clevis connection. In such configuration a single arm extends from one end member and a double arm extends from the opposite end member. The single arm is inserted between the double arm and the combination is pinned such that relative swiveling of the end members is facilitated. This structural configuration results in a build-up of bulky and relatively heavy structure over the intermediate bellows. It also inherently includes stress points which result in structural weakness. The hinged bellows restraint of the present invention eliminates this extreme bulkiness, resultant excessive weight and increases load carrying ability.

It is a primary object of this invention to provide a hinged restraint means for a flexible conduit.

A further object is to provide a hinged restraint compact in its structural characteristics, for use in a flexible conduit.

Still another object is to provide a flexible restraint for insertion intermediate of a conduit, the restrain having the ability to accept high loading characteristics.

A further object is to provide a flexible restraint capable of allowing pivoting in the line of the body rather than over a flexible member thereof.

Yet another object is to provide a flexible restraint for a hinged bellows wherein ease of manufacturing is a prime factor.

Other objects of invention will become apparent from the following description taken in connection with the accompanying drawings, in which:

FIG. 1 is an elevational view in partial cutaway illustrating the hinged bellows restraint;

FIG. 2 is another view of the FIG. 1 hinged bellows restraint taken along line 2—2 without a cutaway portion and illustrating the unit in a typically flexed position; and FIG. 3 is an exploded view of the invention in partial cutaway to illustrate the various components thereof.

The hinged bellows restraint of this invention basically comprises a pair of retainers adapted for connection within a conduit to provide such conduit with flexibility. A flexible bellows is sealably interconnected to the retainers and a restraining cap is engaged within grooves appropriately provided in the retainers. A flanged portion of the restrainer cap is slidable within at least one of the retainer grooves so as to prevent axial movement of the retainers while facilitating relative angular movement.

In detail the hinged bellows restraint of FIG. 1 is generally indicated by the numeral 10. A pair of end members or retainers 11 and 12 are usually bevelled on their ends, as at 13 and 14, to facilitate welding to the conduit intermediate of which they are to be adapted. Obviously, ends 13 and 14 may be threaded or otherwise connectable in other standard ways. Retainer 11 includes boss-like regions 15 and 16 on its diametrically opposite sides and retainer 12 includes similar bosses 17 and 18. These bosses provide sufficient structure for the transfer of loads therethrough and for the means whereby this engagement by a restrainer is facilitated. Extending into boss 15 substantially normal to longitudinal axis 19 is an arcuate groove 20. A second arcuate groove 21 extends in a substantially axial direction from groove 20. This groove configuration is most clearly illustrated in the exploded view of FIG. 3. Similarly, boss 16 includes grooves 22 and 23, boss 17 includes arcuate grooves 24 and 25 and boss 18 includes arcuate grooves 26 and 27. A set screw hole 28 is provided in boss 15 in communication with an extremity of arcuate groove 21 for a purpose to be later described. A similar hole is also provided in boss 18. Arcuate groove 20 includes walls 29 and 30 which are adapted to transmit axial loads during operation. Each of arcuate grooves 22, 24 and 26 include similar load transmitting walls.

Internally, of retainers 11 and 12, passages 31 and 32 are provided. These passages or perforations include recessed portions 33 and 34, respectively, for accepting in an attached relation the ends of a bellows interconnecting the retainers.

A pair of preferably identical restrainer caps 40 are provided as restraints for engagement with retainers 11 and 12. Each of caps 40 includes an annular flange 41 having an inner wall 42 and an outer wall 43. A pair of external arcuate flanges 44 and 45 integrally extend substantially normally from annular flange 41.

Installation of caps 40 in their operable positions is accomplished by aligning retainers 11 and 12 with their faces 35 and 36 facing one another. Caps 40 are then moved into position with flange 41 over arcuate grooves 20 and 24 or 22 and 26. The caps are oriented in positions revolved approximately 90° from the positions illustrated in FIG. 3. Flanges 41 of caps 40 are then moved into engagement respectively with annular grooves 20 and 24 and grooves 22 and 26. When so engaged, caps 40 are rotated such that flanges 44 and 45 move into engagement with arcuate grooves 21, 25, 23 and 27. Set screws 46 and 46a are next inserted into their respective holes until they engage recesses 47. Rotational movement of the cap with respect to arcuate grooves 20, 21, 26 and 27 is thereby prevented. However, it will be noted that although the relative positions of upper cap 40 (as illustrated) and retainer 11 are thereby secured, retainer 12 remains rotatably movable with respect to that cap and retainer 11 remains rotatably movable with respect to the opposite cap. Relative angular movement of retainers 11 and 12 in one plane of axis 19 is thereby facilitated.

Prior to the installation of caps 40 in their described positions a bellows member 50, having axially extending flanges 51 and 52, is moved into position between retainers 11 and 12 such that flange 51 extends into retainer recess 33 and flange 52 extends into retainer recess 34. These flanges are welded or otherwise sealably attached to the recess structure. A positively sealed fluid passage traversing the entire hinged bellows restraint is thereby provided.

When the entire restraint assembly is completed and installed within a line, the portions of the line within which it is installed may be moved relative to one another in a single plane of axis 19. This is accomplished without structural detriment to the line proper or to the hinged bellows restraint of the invention. This device is particularly useful in lines wherein relatively high loads are applied through the hinged bellows restraint in an axial direction. The restraint is capable of accepting such loads in either tension (separating) or compression. When a tension load is applied to a line to which retainer 11 is attached, that load is transmitted from retainer 11 into cap 40 through groove wall 30 and cap internal surface 42. It is then transferred into retainer 12 through groove wall 24. The transmitted load is distributed over a relatively large structural area even though the structure per se is not excessive in size. The continuous annular character of the cap flanges in providing hoop strength, and the bearing relation of the cap surfaces to the surfaces of the annular grooves provide the assembly with great load transmitting capability and structural integrity, despite its comparatively small size.

In order to facilitate flexing of the joint while loads are being applied, it is sometimes desirable to provide a lubricant between the load transmitting surfaces. Therefore, when a high tension loading is to be applied through the joint it is many times desirable to adhere a lubricant liner, such as liner 48, to the internal surface of cap flange 41. When so installed the liner contacts arcuate groove walls 30. Lubricant liner 48 may be fabricated from materials known commercially as nylon (polymeric amide), Teflon (polytetrafluoroethylene), etc. It may be bonded by a commercial bonding agent or otherwise attached to flange 41 in order that its position while installed does not shift under the stress of operating conditions. Similar lubricant liners can obviously be installed on such surface 30 for acceptance of tension loads or surfaces 29 and/or 43 in order that compression loads may be accepted. It is sometimes sufficient to merely place a dry film lubricant such as molybdenum disulfide on these faying surfaces rather than to require installation of lubricant liners.

Through the use of the present invention manufacturing techniques have been greatly facilitated. For example, the retainers are adaptable to manufacturing procedures for production as identical units. The retainers may be made from a single piece of stock, passages being drilled conventionally and the grooves being cut by a simple lathe operation. The stock is then severed into two portions as an appropriate step in the manufacturing procedure. While prior art devices of this nature required the extensive use of milling machines for the shaping of the arms and slots of clevices in close tolerance work, inexpensive lathe turning operations can be utilized almost exclusively in the manufacture of the present device.

Additionally, in conventional hinged bellows restraint mechanisms, the most critical stress concentration points occurred over the bellows at the inside corner of the clevice arms. As size increased in such units and the clevice was moved further from the center of the bellows, the stress load increased. In order to increase the load carrying capability of structures having such inherently detrimental stress points an increase in material thickness to thereby spread the load over a greater surface area was necessary. This resulted in excessively heavy structures. The present invention spreads the stress over the entire inside corner of the cap, a highly rigid structural configuration. The stress region is thereby brought closer to the center line of the structure and stress concentration is reduced.

Through utilization of this invention the conduits thereby connected are enabled to swing in a hinge-like movement. The extent of the hinge movement is restricted only by the angulation which the bellows configuration will allow. It is not usually desirable that angulation of more than approximately 10° on either side of the center line be accommodated. A typical angular deflection $\alpha$ is illustrated in FIG. 2. This angulation is possible regardless of axial loads applied to the restraint by the line members. The device of this invention is particularly adaptable to fluid transmission lines wherein radical changes in temperature and pressure must be accepted. For example, the present restraint has been found particularly adaptable to high pressure lines on the order of 3000 lbs. per square inch.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A hinged restraint for conduits comprising;
   a pair of perforate retainers adapted for connection to pipes, each said retainer including an arcuate groove on juxtaposed peripheral surfaces thereof, a flexible belows sealably interconnecting said retainers, and a retainer cap extending between said retainers and over said bellows, said cap having arcuate flange means on opposite sides thereof slidably engaged in at least one of said arcuate grooves, said arcuate flange means and arcuate grooves lying on the circumference of a circle having a common center, whereby relative axial movement of said retainers is prevented and relative angular movement in a single plane is facilitated.

2. A hinged bellows constraint according to claim 1 wherein said flange means include a second integral arcurate flange means adapted to be engaged in a portion of said arcuate grooves to prevent disengagement of said flange means from said grooves.

3. A hinged bellows restraint comprising
   a pair of hollow retainers adapted for connecting to a pair of conduits, each said retainer including a pair of oppositely positioned bosses, each said boss having an arcuate groove therein substantially parallel to said groove in the other of said bosses, a flexible bellow sealably interconnecting said retainers and providing a continuous passage therewith, and a pair of restrainer caps, each said cap having an annular flange thereon, each said flange being engaged in one said groove in each of said retainers, at least one of said retainers being slidable with respect to each said cap in the plane of said caps.

4. The hinged bellows restraint of claim 3 wherein each said boss also includes means defining a second arcuate groove extending from said first mentioned arcuate groove at approximately 90° with respect thereto, and wherein each said cap flange includes a pair of arcuate flanges, one said arcuate flange being engageable with one said second annular groove means in each of said retainers.

5. The hinged bellows restraint of claim 3 wherein each said boss also includes means defining a second arcuate groove extending from said first mentioned arcuate groove, at approximately 90° with respect thereto, and wherein each said cap flange includes a pair of arcuate flanges, one said arcuate flange being engageable with one said second annular groove means in each of said retainers, and wherein means is provided in one of said bosses in each said retainer and in one of said arcuate flanges in each said cap to prevent relative movement thereof.

References Cited by the Examiner
UNITED STATES PATENTS

| | | | |
|---|---|---|---|
| 1,023,924 | 4/1912 | Corbett | 285—274 |
| 1,876,487 | 9/1932 | Chanaberry | 285—90 |
| 2,707,117 | 4/1955 | Fentress et al. | 285—226 |
| 2,726,104 | 12/1955 | Boitnott et al. | 285—98 |
| 3,019,037 | 1/1962 | Caldwell | 285—226 |
| 3,066,960 | 12/1962 | Adams | 285—226 |

EDWARD C. ALLEN, *Primary Examiner.*

D. W. AROLA, *Assistant Examiner.*